(12) United States Patent
Williams et al.

(10) Patent No.: US 9,452,769 B1
(45) Date of Patent: Sep. 27, 2016

(54) INFANT STROLLER WITH AIR CONDITIONER AND HEATER

(71) Applicants: George Williams, Brooklyn, NY (US); Yolanda Humphrey, Brooklyn, NY (US)

(72) Inventors: George Williams, Brooklyn, NY (US); Yolanda Humphrey, Brooklyn, NY (US)

( * ) Notice: Subject to any disclaimer, the term of this patent is extended or adjusted under 35 U.S.C. 154(b) by 0 days.

(21) Appl. No.: 14/854,208

(22) Filed: Sep. 15, 2015

(51) Int. Cl.
*B62B 9/00* (2006.01)
*B62B 9/10* (2006.01)
*B62B 7/00* (2006.01)
*A47C 7/74* (2006.01)
*B60N 2/56* (2006.01)

(52) U.S. Cl.
CPC .............. *B62B 9/102* (2013.01); *A47C 7/742* (2013.01); *A47C 7/748* (2013.01); *B62B 7/006* (2013.01); *B60N 2/5685* (2013.01); *B60N 2/5692* (2013.01)

(58) Field of Classification Search
CPC ........ A47C 7/74; A47C 7/742; A47C 7/744; A47C 7/746; A47C 7/748; A47C 21/04; A47C 21/042; A47C 21/044; A47C 21/046; A47C 21/048; B60N 2/5692; B60N 2/5685; B60N 2/56; B60N 2/5614; B62B 2204/00; B62B 2204/02; B62B 2204/04
See application file for complete search history.

(56) References Cited

U.S. PATENT DOCUMENTS 4,695,091 A * 9/1987 Altmann .................. B60N 2/58
219/217
4,966,145 A * 10/1990 Kikumoto ................ A47C 7/74
165/46

(Continued)

*Primary Examiner* — Emma K Frick

(57) ABSTRACT

The infant stroller with air conditioner and heater includes a stroller with a seat and seat back that include a cooling member and a heating member. The seat and seat back may be further defined as a flexible membrane that contours to provide a comfortable seating posture. The cooling member may utilize a refrigeration cycle to circulate cooled water through tubing integrated into the seat and seat back. The heating member involves the use of a heating element that when energized releases heat. The heating element is integrated into the construction of the seat and the seat back. Both the heating member and the cooling member are connected to a control member positioned underneath the seat and seat back. The control member is ideally positioned in a storage compartment provided between the wheels of the infant stroller.

8 Claims, 4 Drawing Sheets

(56) References Cited

U.S. PATENT DOCUMENTS

| | | | | |
|---|---|---|---|---|
| 5,117,638 | A * | 6/1992 | Feher | A47C 7/74 165/104.21 |
| 5,516,189 | A * | 5/1996 | Ligeras | A47C 7/748 219/202 |
| 5,902,014 | A * | 5/1999 | Dinkel | B60N 2/5635 297/180.1 |
| 5,934,748 | A * | 8/1999 | Faust | B60N 2/5635 297/180.1 |
| D424,483 | S | 5/2000 | Tripodi | |
| 6,079,781 | A * | 6/2000 | Tilley | B60H 1/00285 297/180.1 |
| 6,127,655 | A | 10/2000 | Humes | |
| 6,409,206 | B1 | 6/2002 | Willrich | |
| 6,786,541 | B2 * | 9/2004 | Haupt | B60H 1/00285 297/180.1 |
| 7,360,772 | B2 | 4/2008 | Koch | |
| 7,581,584 | B2 * | 9/2009 | Yoneno | A47C 7/744 165/202 |
| 7,805,958 | B2 | 10/2010 | Bratcher | |
| 7,886,548 | B1 * | 2/2011 | Graves | B62B 9/00 62/272 |
| 8,011,693 | B2 | 9/2011 | Nooshin | |
| 8,084,722 | B2 | 12/2011 | Haas | |
| 8,353,069 | B1 * | 1/2013 | Miller | A47C 21/044 5/421 |
| 9,040,876 | B2 * | 5/2015 | Bixler | F24H 3/081 219/202 |
| 2007/0033733 | A1 * | 2/2007 | Jen | A47C 7/74 5/423 |
| 2007/0234742 | A1 * | 10/2007 | Aoki | B60H 1/00285 62/3.3 |
| 2008/0084040 | A1 | 4/2008 | McGowan | |
| 2008/0182071 | A1 * | 7/2008 | Cheng | A47C 7/021 428/138 |
| 2012/0151676 | A1 * | 6/2012 | Ellingsen | A61G 13/0009 5/600 |
| 2012/0193948 | A1 * | 8/2012 | Liu | A47C 21/048 297/180.12 |
| 2015/0061331 | A1 * | 3/2015 | Yang | A47C 7/744 297/180.14 |
| 2015/0091339 | A1 * | 4/2015 | Bomhard | B60N 2/5692 297/180.11 |

\* cited by examiner

INFANT STROLLER WITH AIR CONDITIONER AND HEATER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of infant strollers, more specifically, an infant stroller that includes cooling and heating means to provide comfort to the infant seated on the infant stroller.

Infant strollers are widespread, and provide mobility for any parent. However, the infant strollers are limited in terms of keeping an infant reasonably comfortable. This can be problematic when the outside air temperature is freezing or hot. What is needed and is accomplished via the device of the present disclosure is a highly portable infant stroller that includes the ability to cool or heat an infant positioned in said infant stroller.

SUMMARY OF INVENTION

The infant stroller with air conditioner and heater includes a stroller with a seat and seat back that include a cooling member and a heating member. The seat and seat back may be further defined as a flexible membrane that contours to provide a comfortable seating posture. The cooling member may utilize a refrigeration cycle to circulate cooled water through tubing integrated into the seat and seat back. The heating member involves the use of a heating element that when energized releases heat. The heating element is integrated into the construction of the seat and the seat back. Both the heating member and the cooling member are connected to a control member positioned underneath the seat and seat back. The control member is ideally positioned in a storage compartment provided between the wheels of the infant stroller.

It is an object of the invention to provide a stroller that is able to cool or heat the occupant.

It is a further object of the invention to provide a stroller that includes a heating member and a cooling member, which are integrated into the construction of the stroller directly.

These together with additional objects, features and advantages of the infant stroller with air conditioner and heater will be readily apparent to those of ordinary skill in the art upon reading the following detailed description of the presently preferred, but nonetheless illustrative, embodiments when taken in conjunction with the accompanying drawings.

In this respect, before explaining the current embodiments of the infant stroller with air conditioner and heater in detail, it is to be understood that the infant stroller with air conditioner and heater is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the infant stroller with air conditioner and heater.

It is therefore important that the claims be regarded as including such equivalent construction insofar as they do not depart from the spirit and scope of the infant stroller with air conditioner and heater. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
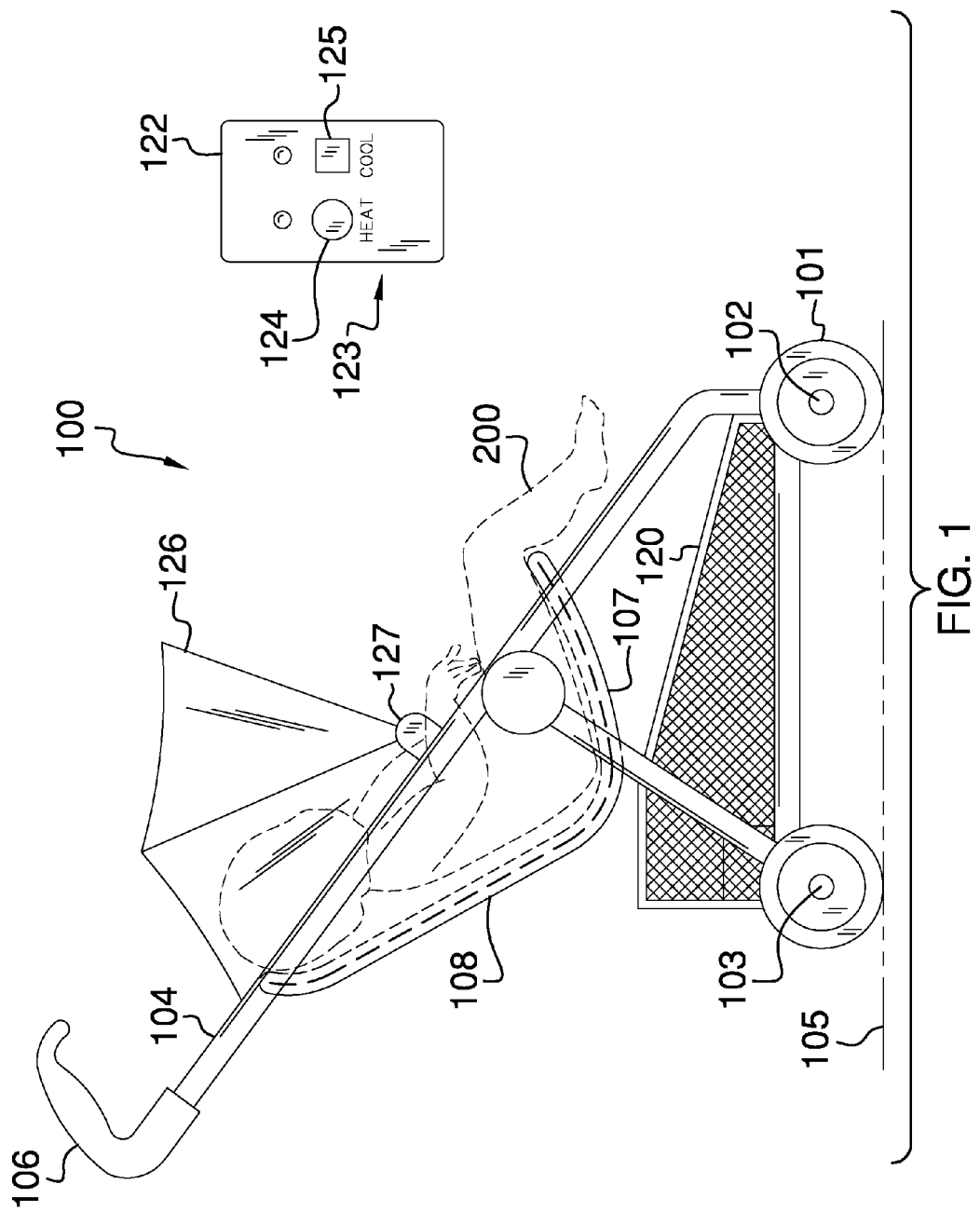
FIG. 1 is a side view of an embodiment of the disclosure.
Figure 2:
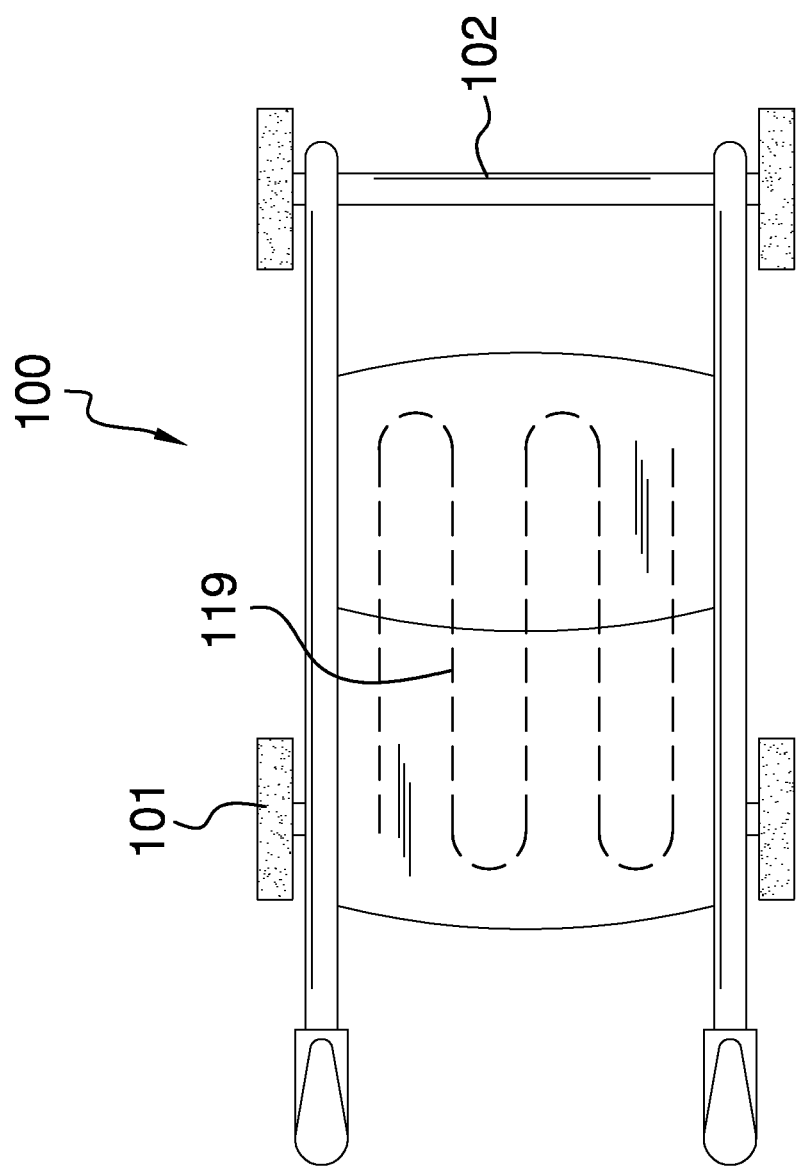
FIG. 2 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The infant stroller with air conditioner and heater 100 (hereinafter invention) comprises a plurality of wheels 101 rotatable affixed to a first axle 102 and a second axle 103. Both the first axle 102 and the second axle 103 are affixed to a frame 104 that extends upwardly with respect to a ground surface 105.

The frame 104 includes at least one handle 106 as well as a seat 107 and a seat back 108. The seat 107 and the seat back 108 are adapted to support an infant 200 thereon. The seat 107 and the seat back 108 are of the same construction, and include a first layer 109 and a second layer 110. The first layer 109 and the second layer 110 sandwich a padding layer 111 there between.

The padding layer 111 is constructed of a soft foam. The seat 107 and the seat back 108 are collectively flexible, and provide comfort to the infant 200 seated thereon. It shall be noted that the term infant 200 is being used to refer to a person, and shall not be limited to any age. Moreover, the term infant 200 may also be exchanged for rider or occupant. The padding layer 111 has a cooling member 112 and a heating member 113 integrated into the construction.

The cooling member 112 is further defined with a tubing 114 that traverses back and forth with respect to both the seat 107 and the seat back 108. The tubing 114 circulates a cooling medium, which is ideally a water or bromine solution. The tubing 114 is in fluid communication with a refrigeration member 115 that is located elsewhere with respect to the invention 100. The refrigeration member 115 is responsible for chilling the cooling medium that is circulated through the tubing 114 thereby removing heat from the padding layer 111 in order to cool the infant 200 seated on the seat 107 and the seat back 108.

The refrigeration member 115 is in wired connection with a control module 116. The control module 116 may be in relative proximity of the refrigeration member 115. The control module 116 is supplied electricity via a powering member 117. The powering member 117 may include at least one battery. Moreover, the at least one battery may be rechargeable. The powering member 117 may be in relative proximity of the control module 116. The control module 116 is essentially a central processing member, and controls all aspects of operation of the invention 100. Moreover, the control module 116 controls operation of the cooling member 112 as well as the heating member 113. The control module 116 controls electrical flow to the refrigeration member 115 or to a heating module 118.

The heating module 118 is in wired connection with a heating element 119. The heating module 118 may include a transformer that adjusts the voltage provided via the control module 116 before dispensing to the heating element 119. Both the heating module 118 and the heating element 119 form the heating member 113. The heating element 119 is integrated into the construction of the padding layer 111 of the seat 107 and the seat back 108. The heating element 119 emits heat when supplied electricity via the heating module 118. The heat generated via the heating element 119 transfers to the padding layer 111 via conductive heat transfer, and which is then dispensed to the infant 200 seated on the seat 107 and the seat back 108. It shall be noted that conductive heat transfer is also employed to remove heat from the padding layer 111 via the tubing 114 when the cooling member 112 is in use.

Figure 3:
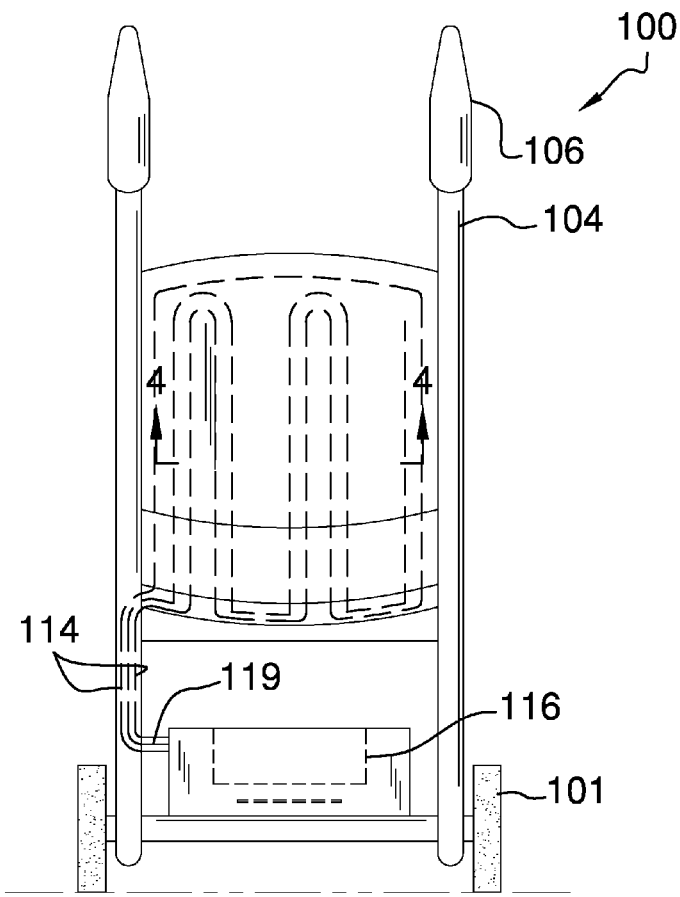
FIG. 3 is a back view of an embodiment of the disclosure.
Figure 4:
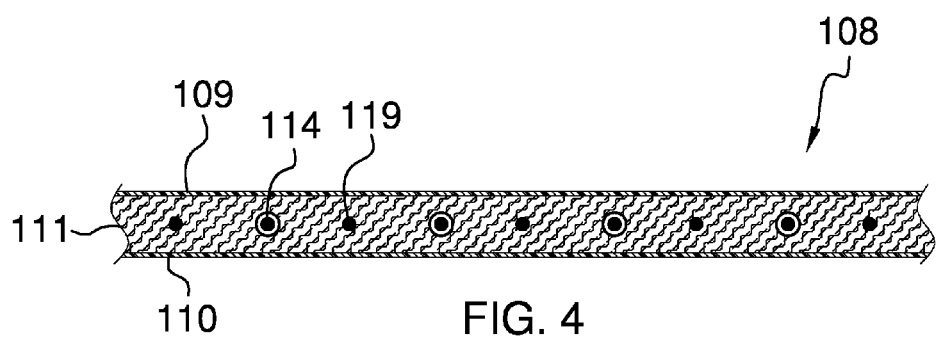
FIG. 4 is a cross-sectional view of an embodiment of the disclosure along line 4-4 in FIG. 3.
Figure 5:
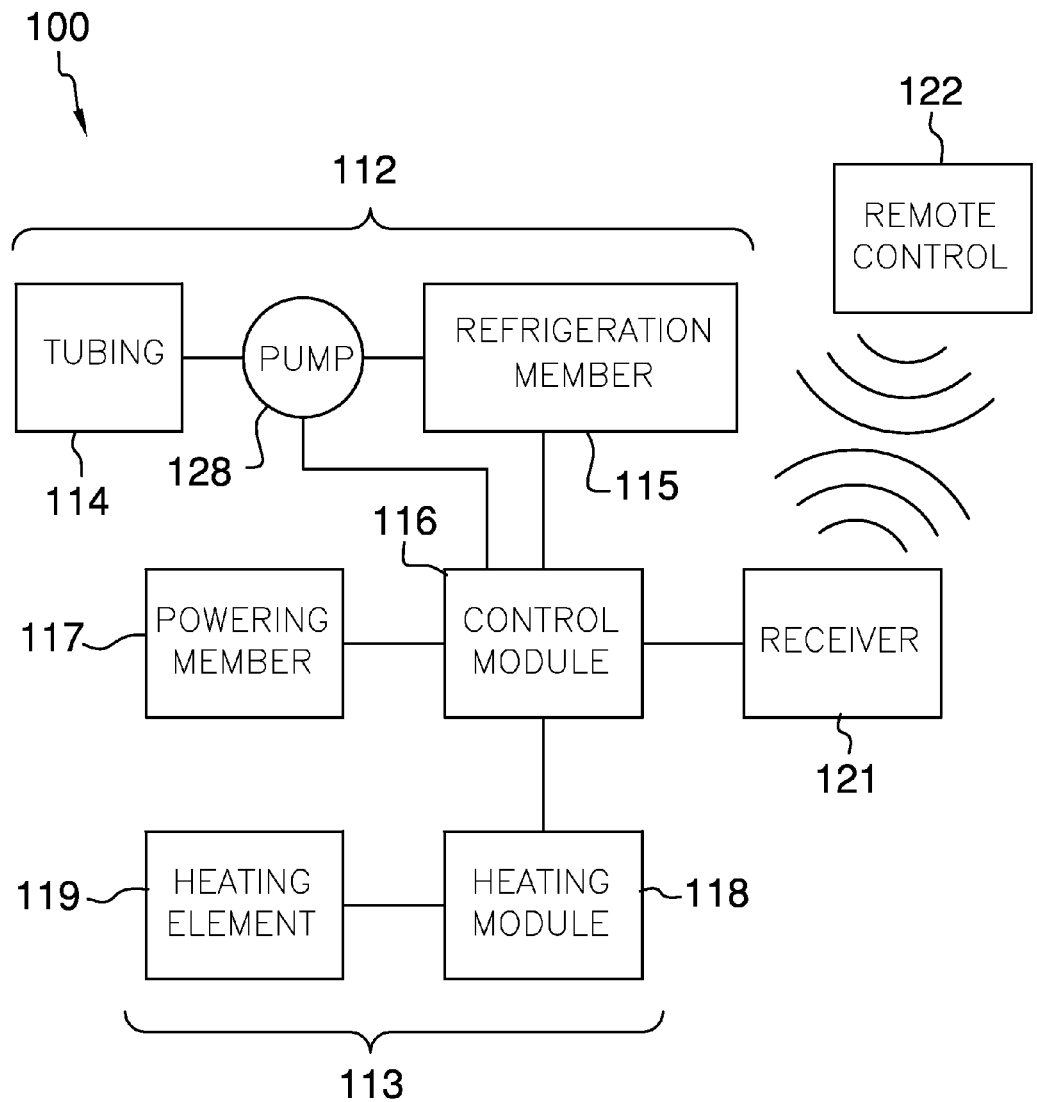
FIG. 5 is a block diagram of components associated with an embodiment of the disclosure.

The tubing 114 and the heating element 119 traverse across both the seat 107 and the seat back 108. Moreover, the tubing 114 and the heating element 119 connect to the control module 116, which is ideally positioned below the seat 107. In FIG. 3, the control module 116 is positioned in a basket 120 that is located between the plurality of wheels 101. The basket 120 may be to also support the powering member 117.

The control module 116 is wired to a receiver 121. The receiver 121 enables wireless communication with a remote control 122. The remote control 122 is able to communicate with the control module 116 in order to adjust operation of either the cooling member 112 as well as the heating member 113. The remote control 122 includes at least one button 123 that when depressed signals the receiver 121, which then communicates to the control module 116. The at least one button 123 may be further defined with a heat button 124 as well as a cool button 125. The heat button 124 signals the control module 116 to operate the heating member 113. The cool button 125 signals the control module 116 to operate the cooling member 112.

The frame 104 may include a canopy 126 that provides shade to the infant 200 seated on the seat 107 and the seat back 108. The canopy 126 is positioned above the seat 107 and the seat back 108. Moreover, the canopy 126 is well known in the art of strollers. The canopy 126 may pivot via a pivoting hinge 127 provided on the frame 104.

It shall be noted that the refrigeration member 115 may be a miniature version that utilizes a Freon in order to generate the coldness needed to chill the cooling medium circulated via the tubing 114. It shall also be noted that the tubing 114 may require a pump 128 to circulate the cooling medium inside of the tubing 114. Moreover, the pump 128 shall be in wired connection with the control module 116. The refrigeration member 115 may be the size of a fist, and commercially available units currently exist.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A stroller comprising:
  a frame that supports a seat and a seat back;
  wherein a plurality of wheels are affixed to a first axle and a second axle;
  wherein the first axle and the second axle attach to the frame to enable mobility of the stroller with respect to a ground surface;
  wherein the seat and the seat back have a cooling member and a heating member integrated therein, and which are adapted to cool or heat an occupant seated on said seat or seat back;
  wherein the frame includes at least one handle;
  wherein the seat and the seat back are each further defined with a first layer and a second layer;
  wherein the first layer and the second layer sandwich a padding layer there between;
  wherein the padding layer is constructed of a soft foam; wherein the seat and the seat back are collectively flexible, and provide comfort to the occupant seated thereon;
  wherein the padding layer has the cooling member and the heating member integrated therein;
  wherein the cooling member is further defined with a tubing that traverses back and forth with respect to both the seat and the seat back; wherein the tubing circulates a cooling medium, which conductively removes heat from the padding layer;

wherein the tubing is in fluid communication with a refrigeration member; wherein the refrigeration member is responsible for chilling the cooling medium that is circulated through the tubing thereby removing heat from the padding layer in order to cool the occupant seated on the seat and the seat back;

wherein the refrigeration member is in wired connection with a control module; wherein the control module is in relative proximity of the refrigeration member;

wherein the control module is supplied electricity via a powering member;

wherein the powering member is in relative proximity of the control module; wherein the control module controls operation of the cooling member as well as the heating member; wherein the control module controls electrical flow to the refrigeration member and to a heating module;

wherein the heating module is in wired connection with a heating element;

wherein the heating module includes a transformer that adjusts the voltage provided via the control module before dispensing to the heating element; wherein both the heating module and the heating element form the heating member.

2. The stroller according to claim 1 wherein the heating element is integrated into the construction of the padding layer of the seat and the seat back; wherein the heating element emits heat when supplied electricity via the heating module; wherein heat generated via the heating element transfers to the padding layer via conductive heat transfer, and which is then dispensed to the occupant on the seat and the seat back.

3. The stroller according to claim 2 wherein the tubing and the heating element traverse across both the seat and the seat back; wherein the tubing and the heating element connect to the control module, which is positioned below the seat.

4. The stroller according to claim 3 wherein the control module is positioned in a basket that is located between the plurality of wheels; wherein the basket also supports the powering member.

5. The stroller according to claim 4 wherein the control module is wired to a receiver; wherein the receiver enables wireless communication with a remote control; wherein the remote control is able to communicate with the control module in order to adjust operation of either the cooling member as well as the heating member; wherein the remote control includes at least one button that when depressed signals the receiver, which then communicates to the control module.

6. The stroller according to claim 5 wherein the at least one button is further defined with a heat button as well as a cool button; wherein the heat button signals the control module to operate the heating member; wherein the cool button signals the control module to operate the cooling member.

7. The stroller according to claim 6 wherein the frame includes a canopy that provides shade to the occupant seated on the seat and the seat back; wherein the canopy is positioned above the seat and the seat back; wherein the canopy pivots via a pivoting hinge provided on the frame.

8. The stroller according to claim 7 wherein the tubing is in fluid connection with a pump that circulates the cooling medium; wherein the pump is in wired connection with the control module.

\* \* \* \* \*